Oct. 20, 1931.  J. H. RAMSEY  1,828,071
HIGHWAY GUARD RAIL
Filed Aug. 4, 1930
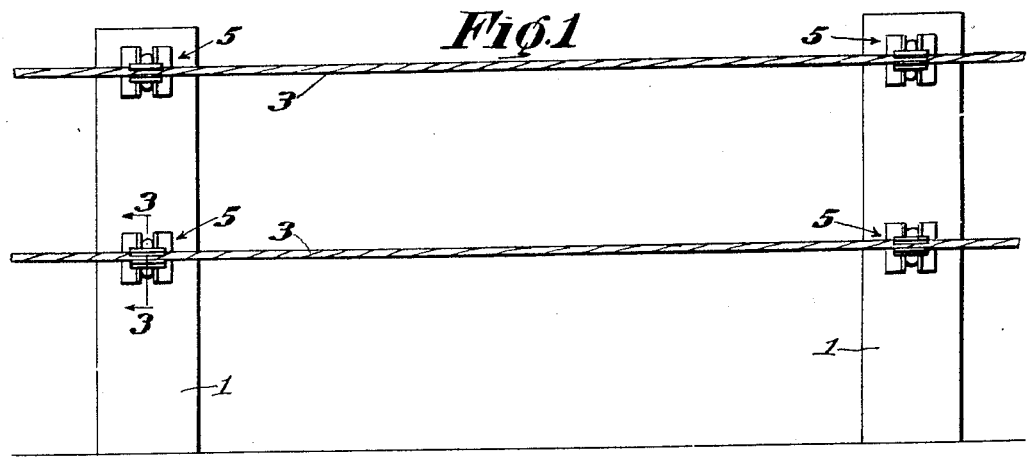
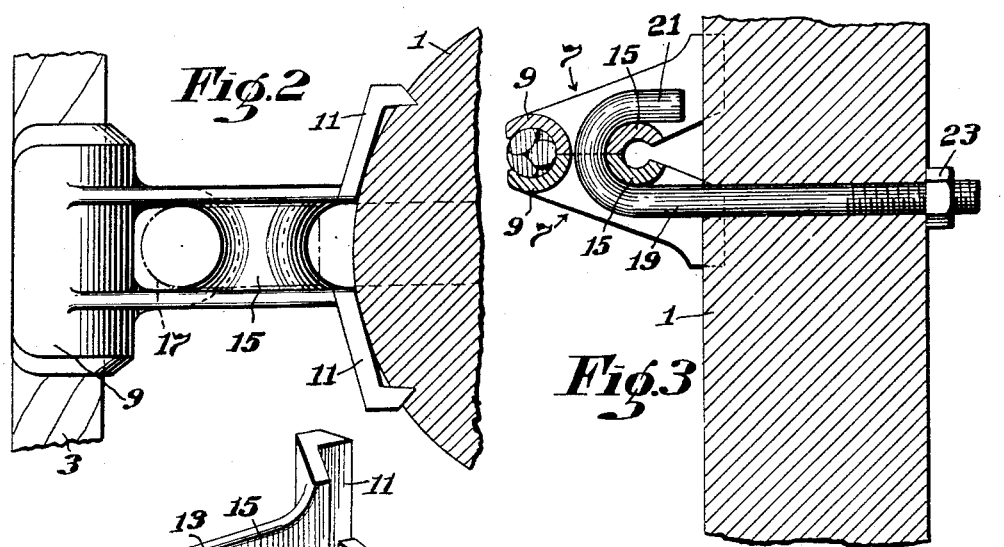
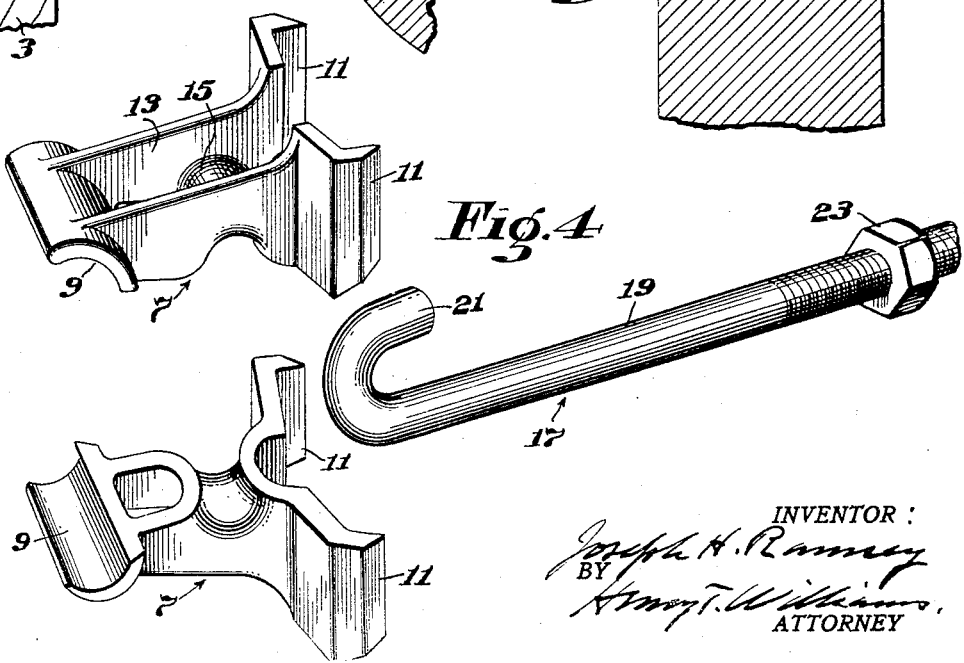

Patented Oct. 20, 1931

1,828,071

UNITED STATES PATENT OFFICE

JOSEPH H. RAMSEY, OF ALBANY, NEW YORK

HIGHWAY GUARD RAIL

Application filed August 4, 1930. Serial No. 472,777.

This invention relates to highway guard rails. A usual type comprises strong steel cables secured by bolts to posts or other supports. These bolts project beyond the cables and are liable to be struck by fenders, hub caps, and the rims of automobile wheels. Since the introduction of balloon tires, the destructive effect of the sharp edges of the rims has been particularly notable, because relatively soft tires are easily deflected, and the sharp rims often strike unprotected bolts with sufficient force to damage the steering gear of the automobile, with consequent liability of serious accident to occupants of the automobile.

A purpose of the present invention, therefore, is to provide a device for connecting the guard rail to the post so constructed that there is little or no part projecting beyond the roadside surface of the guard rail liable to be struck by parts of an automobile. Another purpose is to provide a simple, inexpensive device for supporting the guard rail which may be quickly and easily connected to the guard rail and secured to the post, and without the necessity of threading the guard rail through the device.

The character of the invention may be best understood by reference to the following description of one good form thereof shown in the accompanying drawings, wherein:

Fig. 1 is an elevation of two posts and cables secured thereto by devices embodying the invention;

Fig. 2 on an enlarged scale is a view of a portion of the cable, a sectional portion of a post and one of the devices applied thereto, the bolt being shown in dot-and-dash lines;

Fig. 3 on an enlarged scale is a vertical section taken on line 3—3 of Fig. 1; and Fig. 4 is a perspective view showing the parts unassembled.

Referring to the drawings, 1 designates posts of concrete or other suitable material carrying guard rails, in the present instance in the form of strong steel cables 3 secured to the posts by devices 5. Each of these devices comprises a pair of members 7 having opposed curved seats 9 adjacent to the ends of said members for receiving the cable, and outstanding feet 11 at opposite ends of the members for engagement with the post or other support. These members are of sufficient length to hold the cable spaced from the post so as to tend to prevent wheel hubs from striking the post. The members have openings or recesses 13 and coupling elements in the form of opposed half round lugs 15 formed integrally with the members, and exposed and accessible through the openings. To hold the members together and secure them to the posts, a bolt 17 is provided having a shank 19, a hook 21 and a nut 23.

In assembling the parts the hook end of the bolt is inserted through the opening in one of the members and rocked to a position in which the hook embraces the coupling lugs. The shank of the bolt occupies the recess in one of the members, and the hook end occupies the recess in the other member. The members may be rocked to open the seats to admit the cable therein. Then the shank of the bolt is inserted through a hole in the post, and the nut of the bolt is set up securely to connect the device to the post. In setting up the nut, the shank of the bolt will be drawn longitudinally, and in so doing will tend to rock the members on their feet toward each other. This simple adjustment will press the members toward each other, press the members against the post, and cause all of the parts to be tightly assembled. Preferably the curved seats do not grip or completely embrace the cable, so that the roadside surface of the cable will be exposed between the seats and be substantially flush with the outer ends of the members. As a consequence, a wheel or other part of an automobile sliding along the cable toward the device will slip past the same without striking the device and injuring the same. Also preferably the cable is free to render through the seats if sufficient pressure is placed on it.

By this invention a highly desirable bracket is provided for supporting the guard rail on the posts. It is simple in construction, inexpensive to manufacture, and may be quickly and easily applied to the rail and posts.

It will be understood that the term "hook bolt" in certain of the claims is to be regarded as generic to a U-shaped bolt.

The invention is not limited to the specific embodiment shown, and various deviations may be made therefrom without departing from the spirit and scope of the appended claims.

What is claimed is:

1. A support for a highway guard-rail comprising mating members having opposed seats for embracing said guard-rail, a pair of side-frames for supporting the guard-rail in spaced relationship to a post, a pair of substantially semi-circular lugs interposed between the side-frames and adapted to be embraced by a hook-bolt, and a clearance provided when the mating members are assembled one with the other to permit introduction of the hook-bolt between the side-frames and its subsequent rotation upon the lugs into normal operative position.

2. A support for a highway guard-rail comprising similar mating members having opposed seats for embracing said guard-rail, a pair of side-frames for supporting the guard-rail in spaced relationship to a post, coupling elements interposed between the side-frames and adapted to be embraced by a securing member, and a clearance provided when the mating members are assembled one with the other to permit introduction of the securing member between the side-frames into its operative position relative to the mating members and the post.

3. A support for a highway guard-rail comprising mating members having opposed seats for receiving said guard-rail, a pair of side-frames for supporting the guard-rail in spaced relationship to a post, coupling elements interposed between the side-frames and adapted to be embraced by a hook-bolt, and a clearance provided when the mating members are assembled one with the other to permit introduction of the hook-bolt between the side-frames into its operative position relative to the mating members and the post.

4. A support for a highway guard-rail comprising substantially U-shaped mating members having opposed seats at their closed ends for receiving said guard-rail, coupling elements connecting the arms of the mating members, and a securing member embracing the coupling elements to hold the mating members in assembled relationship to each other and a post, said mating members being provided with a clearance when assembled one with the other to permit introduction of the securing member within the arms of the mating members into its operative position relative to the mating members and the post.

JOSEPH H. RAMSEY.